(12) United States Patent
Hyun (10) Patent No.: US 12,193,531 B2
(45) Date of Patent: Jan. 14, 2025

(54) DUST MASK

(71) Applicant: Han Wool Hyun, Hwaseong-si (KR)

(72) Inventor: Han Wool Hyun, Hwaseong-si (KR)

( * ) Notice: Subject to any disclaimer, the term of this patent is extended or adjusted under 35 U.S.C. 154(b) by 0 days.

(21) Appl. No.: 17/641,838

(22) PCT Filed: Nov. 12, 2019

(86) PCT No.: PCT/KR2019/015307
§ 371 (c)(1),
(2) Date: Mar. 10, 2022

(87) PCT Pub. No.: WO2021/054519
PCT Pub. Date: Mar. 25, 2021

(65) Prior Publication Data
US 2023/0380524 A1 Nov. 30, 2023

(30) Foreign Application Priority Data

Sep. 16, 2019 (KR) .......................... 10-2019-0113814

(51) Int. Cl.
*A41D 13/11* (2006.01)
(52) U.S. Cl.
CPC ...... *A41D 13/1107* (2013.01); *A41D 13/1161* (2013.01)
(58) Field of Classification Search
None
See application file for complete search history.

(56) References Cited

U.S. PATENT DOCUMENTS

| | | | | |
|---|---|---|---|---|
| 5,706,803 A * | 1/1998 | Bayer | ................. | A62B 18/084 128/205.27 |
| 5,817,584 A * | 10/1998 | Singer | ................. | D04H 1/4291 442/364 |
| 6,159,878 A * | 12/2000 | Marsh | ...................... | B32B 7/12 428/920 |
| 6,213,125 B1 * | 4/2001 | Reese | ................ | A41D 13/1184 2/9 |
| 6,484,722 B2 * | 11/2002 | Bostock | ............ | A41D 13/1161 128/206.19 |
| 6,705,317 B2 * | 3/2004 | Castiglione | .......... | A62B 23/025 604/179 |
| 11,213,080 B2 * | 1/2022 | Henderson | ......... | A41D 13/1161 |
| 2009/0145444 A1 * | 6/2009 | Edwards | .............. | A62B 18/084 128/206.13 |

(Continued)

FOREIGN PATENT DOCUMENTS

JP 11-206896 A 8/1999
KR 200446210 Y1 * 10/2009 ......... A41D 13/1161
(Continued)

*Primary Examiner* — Grace Huang
(74) *Attorney, Agent, or Firm* — Bridgeway IP Law Group, PLLC; Sang Ho Lee; Hyun Woo Shin (57) ABSTRACT

An invention relating to a dust mask is disclosed. The disclosed invention is characterized in that ear bands are slidably coupled to a mask main body by coupling members ultrasonic-welded to the mask main body. According to the present invention, provided is the effect of enabling stable maintenance of closeness of the mask to the face of a wearer while enabling the wearer to easily and conveniently select the level of closeness of the mask that matches the preference of the wearer by allowing adjustment of the state of ear bands as necessary.

5 Claims, 12 Drawing Sheets

(56) References Cited

U.S. PATENT DOCUMENTS

| | | | |
|---|---|---|---|
| 2012/0030912 A1* | 2/2012 | Turdjian | A41D 13/1161 |
| | | | 24/196 |
| 2017/0258159 A1* | 9/2017 | Moore | A41F 9/02 |
| 2018/0021608 A1* | 1/2018 | Zhou | A62B 23/025 |
| | | | 128/863 |
| 2021/0227902 A1* | 7/2021 | Berlese | A41D 19/0006 |
| 2022/0008765 A1* | 1/2022 | Park | A01N 59/00 |
| 2022/0047015 A1* | 2/2022 | Duffy | A62B 23/025 |
| 2023/0292858 A1* | 9/2023 | Gordon | A41D 13/1115 |
| | | | 128/207.11 |

FOREIGN PATENT DOCUMENTS

| | | | | |
|---|---|---|---|---|
| KR | 10-0996678 B1 | | 11/2010 | |
| KR | 10-2011-0024310 A | | 3/2011 | |
| KR | 20130109654 A | * | 10/2013 | ......... A41D 13/1161 |
| KR | 10-1788685 B1 | | 10/2017 | |
| KR | 10-2018-0016192 A | | 2/2018 | |
| KR | 10-2018-0117338 A | | 10/2018 | |
| KR | 101918084 B1 | * | 11/2018 | ......... A41D 13/1115 |
| KR | 20-0488541 Y1 | | 2/2019 | |
| KR | 102273319 B1 | * | 7/2021 | ......... A41D 13/1161 |

* cited by examiner

DUST MASK

TECHNICAL FIELD

The present invention relates to a mask, and more particularly, to a dust mask for preventing fine dust and the like in the air from entering the inside of a human body through a respiratory tract.

RELATED ART

It is well known that a lot of dust is generated in workplaces such as paper mills, textile mills, and quarries. In particular, a large amount of toxic gas is generated in chemical plants and metal processing plants in which welding, smelting, and plating are performed.

Currently, fine dust and yellow dust frequently occur, which is emerging as another social issue. Also, various types of harmful dust are significantly increasing in subways, roads, etc., compared to the past.

In the case of inhaling such dust, yellow dust, harmful dust, etc., it may cause a fatal disease in a lung and the like and also causes asthma. Therefore, in sports and mountaineering as well as various types of industrial sites, it is becoming more common to wear a dust mask to prevent such dust or harmful substances from entering a respiratory tract.

The dust mask may be classified into one for children and one for adults based on a size. This is a classification that considers a basic facial size according to an age of a wearer. However, people of the same age have different facial sizes. To improve effectiveness of the dust mask, it is important how well the dust mask may adhere to a face.

The purpose of wearing the dust mask is to inhale the fresh air as much as possible by filtering the outside polluted air. Therefore, in addition to improving infiltration performance by enhancing quality of filter paper, it is important to make the dust mask adhere well to fit the curved facial contour of a wearer, that is, the curved surface of a nose, a cheek, chin, etc.

To increase adhesion between the dust mask and the face, a length of an ear band needs to be properly adjusted. The ear band is hung on an ear of a wearer and serves to fasten the dust mask to the face of the wearer. How well the dust mask may be in close contact with the face may greatly depend on the length of the ear band.

However, in the conventional dust mask, the ear band is mostly in a form of an elastic string cut to a predetermined length and coupled to each of both sides of a mask. The ear band of the conventional dust mask may be adjusted in length to some extents due to its elasticity. However, the ear band of the conventional dust mask may be simply adjusted in length, such as extending the length to some extent using elasticity. Length adjustment, such as reducing the length of the ear band, is impossible. Also, when the length of the ear band is excessively extended, the face of the wearer may be excessively pressurized, which may degrade wearability.

DETAILED DESCRIPTION OF INVENTION

Technical Subject

An objective of the present invention is to provide a dust mask with an improved structure such that a length of an ear band may be effectively adjusted.

Also, another objective of the present invention is to provide a dust mask with an improved structure such that a length of an ear band may be adjusted and the ear band may be stably fastened to a mask.

Also, another objective of the present invention is to provide a dust mask with an improved structure such that an ear band may be stably fastened to a mask and occurrence of the skin irritation due to a fastening portion of the ear band may be suppressed.

Technical Solution

A dust mask that is an example embodiment of the present invention to achieve the objectives may slidably couple an ear band to a mask body through a coupling member that is ultrasonic-fused to the mask body.

Through this, the ear band may be installed to be adjustable in length on the mask body. Only when at least a predetermined level of force is applied, the length is adjustable. Otherwise, a fastened state on the mask body may be stably maintained.

A dust mask according to an aspect of the present invention includes a mask body to which at least one filter paper is provided; an ear band configured to connect to the mask body; and an ear band coupler configured to connect the ear band to the mask body through connection to the ear band. The ear band coupler includes a first coupler and a second coupler that are provided to be spaced apart by a predetermined interval in a longitudinal direction, the ear band is connected to the mask body by connecting different portions of the ear band to the first coupler and the second coupler, respectively, the ear band includes an inner section provided between the first coupler and the second coupler and an outer section provided on an outside of the first coupler and the second coupler, the inner section and the outer section are interconnected such that a length of the outer section decreases according to an increase in a length of the inner section and the length of the outer section increases according to a decrease in the length of the inner section, at least one of the first coupler and the second coupler includes a sliding coupler configured to connect to the ear band such that the ear band is movable relative to the mask body, the sliding coupler includes a first coupling member configured to cover the ear band and to couple to the mask body such that the ear band is provided in-between with the mask body, the first coupling member is configured to couple to the mask body from each of both sides of a horizontal direction based on the ear band, and a movement passage into which the ear band slidably inserts is formed between coupling portions between the first coupling member and the mask body.

Also, the ear band may be formed of an elastic material capable of increasing a length of the ear band according to a decrease in a thickness of the ear band from a default state, and the first coupling member may be configured to couple to the mask body such that the movement passage is formed with a width less than a thickness of the air band that is in the default state.

Also, the sliding coupler may be formed in such a manner that the first coupling member is ultrasonic-fused to the mask body.

Also, a grid pattern may be formed in a fusion portion between the first coupling member of the sliding coupler and the mask body.

Also, the first coupling member may be formed of a material with a greater strength than that of the mask body.

Also, the dust mask may further include a fastening coupler configured to fasten a portion of the ear band to the mask body. One of the first coupler and the second coupler may include the sliding coupler, and the other one of the first coupler and the second coupler may include the fastening coupler.

Also, the ear band may be formed in a form of a string with a predetermined length and may be fastened to the mask body through a single fastening coupler in a state in which one end and the other end of the ear band in the longitudinal direction are provided to be adjacent to each other.

Also, the fastening coupler may include a second coupling member configured to cover the one end and the other end of the ear band in the longitudinal direction and to couple to the ear band and the mask body, and the fastening coupler may be formed in such a manner that the second coupling member is ultrasonic-fused to the ear band and the mask body.

Effect of the Invention

According to a dust mask of the present invention, a wearer may easily and conveniently select a feeling of close contact with a mask suitable for a preference of the wearer and a state in close contact with a face of the wearer may be stably maintained by adjusting a state of an ear band if necessary.

Also, the present invention enables installation of an ear band through a simple process of ultrasonic-fusing a first coupling member to a mask body in a state in which the ear band is pulled, such that a feeling of adhesion, that is, close contact may be easily and conveniently controlled, such a state of close contact may be stably maintained, and a manufacture may be easily performed with low manufacturing cost.

Also, the present invention may effectively decrease occurrence of skin irritation caused by a dust mask by installing an ear band using an ultrasonic fusion method instead of using a chemical adhesive.

MODE

Initially, an ear band 200 is placed on a mask body 100 at a position at which a sliding coupler 300 is to be formed. The present example embodiment relates to an example in which the sliding coupler 300 is formed in each of both a first coupler A and a second coupler B. In this case, the ear band 200 may be provided at positions at which the first coupler A and the second coupler B are to be formed. Here, the ear band 200 may be arranged such that a portion to be placed on each coupler (A, B) may be in a straight line.

The ear band 200 is provided to the mask body 100 and, here, a length of the ear band 200 may increase by pulling the ear band 200 in a longitudinal direction in a state in which a portion of the ear band 200 placed on the mask body 100 is in a longitudinally straight line. Here, a right point for pulling the ear band 200 needs to be an outside of the first coupler A and the second coupler B, that is, a point lower than the first coupler A and a point higher than the second coupler B.

Therefore, a thickness of a portion of the ear band that passes through the first coupler A and the second coupler B of the ear band 200 becomes thinner than that in a default state. In this state, a first coupling member 310 covers each of portions of the mask body on in which the first coupler A and the second coupler B are to be formed and the first coupling member 310 couples to the mask body 100.

The present example embodiment relates to as an example in which each of the mask body 100 and the first coupling member 310 is formed of a polypropylene (PP) material. Coupling between the mask body 100 and the first coupling member 310 formed of such a material may be performed through ultrasonic fusion.

As another example, the first coupling member 310 may be formed of a material with a greater strength than that of the mask body 100. For example, the mask body 100 may be formed of a polypropylene material and the first coupling member 310 may be formed of a polyethylene (PE) material. In this case, a strength of a portion in which the sliding coupler 300 is formed may be further improved. That is, the strength of the sliding coupler 300 may further increase compared to that of the rest of the mask body 100 since a single member, that is, the first coupling member 310 further overlaps the mask body 100 and may be further improved due to the first coupling member 310 formed of a material with a greater strength than that of the mask body 100.

Here, fusion between the first coupling member 310 and the mask body 100 may be performed such that the first coupling member 310 may maintain a close contact state with the ear band 200 in the sliding coupler 300. That is, the first coupling member 310 may be fused with the mask body 100 up to a position as close as possible to the ear band 200 within the range in which fusion with the ear band 200 does not occur and, in this manner, may be coupled to the mask body 100 with maintaining a close contact state with the ear band 200.

In addition, in the first coupling member 310, the fusion between the first coupling member 310 of the sliding coupler 300 and the mask body 100 may be performed in a grid pattern. As a result, a fusion portion between the first coupling member 310 of the sliding coupler 300 and the mask body 100 may be formed in a grid pattern.

As described above, as the fusion portion between the first coupling member 310 of the sliding coupler 300 and the mask body 100 is formed in the grid pattern, the strength of the sliding coupler 300 may be further improved. In particular, since a structure, that is, a rib structure that protrudes in a thickness direction of the mask body 100 may be formed in a grid pattern in the sliding coupler 300, a bending strength of an area of the sliding coupler 300 may be further effectively improved.

The sliding coupler 300 is a portion in which coupling between the mask body 100 and the ear band 200 is performed and is also a portion to which a largest force is applied when a dust mask 10 is worn.

Considering this, the present example embodiment may effectively improve a strength of the corresponding portion by adding the first coupling member 310 formed of a material with the greater strength than that of the mask body 100 to the sliding coupler 300 and by forming the rib structure in the grid pattern in the corresponding portion. Through this, when wearing the dust mask 10, it is possible to effectively prevent the corresponding portion from being damaged due to bending or deformation.

Meanwhile, by extending the length of the ear band 200 before fusion between the mask body 100 and the first coupling member 310 is performed, the thickness of the ear band 200 becomes thinner than in the default state.

As described above, when the fusion between the mask body 100 and the first coupling member 310 is performed in a state in which the thickness of the ear band 200 is thinned, a movement passage 315 into which the ear band 200 is inserted may be formed with a narrower width than the thickness of the ear band 200 that is in the default state.

As described above, when the movement passage 315 is formed with the narrow width, the ear band 200 inside the movement passage 315 may be pressed by the sliding coupler 300 when the pulled ear band 200 is released and returns to the default state. That is, a strong frictional force acts between the ear band 200 and the sliding coupler 300.

Accordingly, the ear band 200 slidably couples to the sliding coupler 300. Here, the ear band 200 moves relative to the sliding coupler 300 only when a predetermined level of force is applied and otherwise, maintains a fastened state to the sliding coupler 300.

The thickness of the ear band 200 when the fusion between the mask body 100 and the first coupling member 310 is performed may be 91% to 98% of the thickness of the ear band 200 in the default state. Desirably, the thickness of the ear band 200 may be 95% of the thickness of the ear band 200 in the default state.

When the thickness of the ear band 200 is less than 91% of the thickness of the ear band 200 in the default state, that is, when the ear band 200 is excessively pulled, sliding movement of the ear band 200 may not be properly performed. Also, due to elasticity of the ear band 200 that tries to return to the default state, an excessive force may be applied to the fusion portion between the mask body 100 and the first coupling member 310, which causes a risk of damage to the sliding coupler 300.

Also, when the thickness of the ear band 200 is greater than 98% of the thickness of the ear band 200 in the default state, that is, when the ear band 200 is excessively less pulled, fastening of the ear band 200 to the sliding coupler 300 may not be properly performed. That is, when the dust mask 10 is worn, the ear band 200 moves without properly being fastened to the sliding coupler 300, which makes it difficult to stably wear the dust mask 10.

Considering this, the present example embodiment may form the sliding coupler 300 in a state in which the thickness of the ear band 200 is 91 to 98%, more desirably, 95%, of the thickness of the ear band 200 in the default state when fusion between the mask body 100 and the first coupling member 310 is performed.

Through this, a length of an outer section 220 of the ear band 200 may be easily and conveniently adjusted and the dust mask 10 may be stably fastened to the face.

[Structure of Forming a Close Contact Portion]

Figure 6:
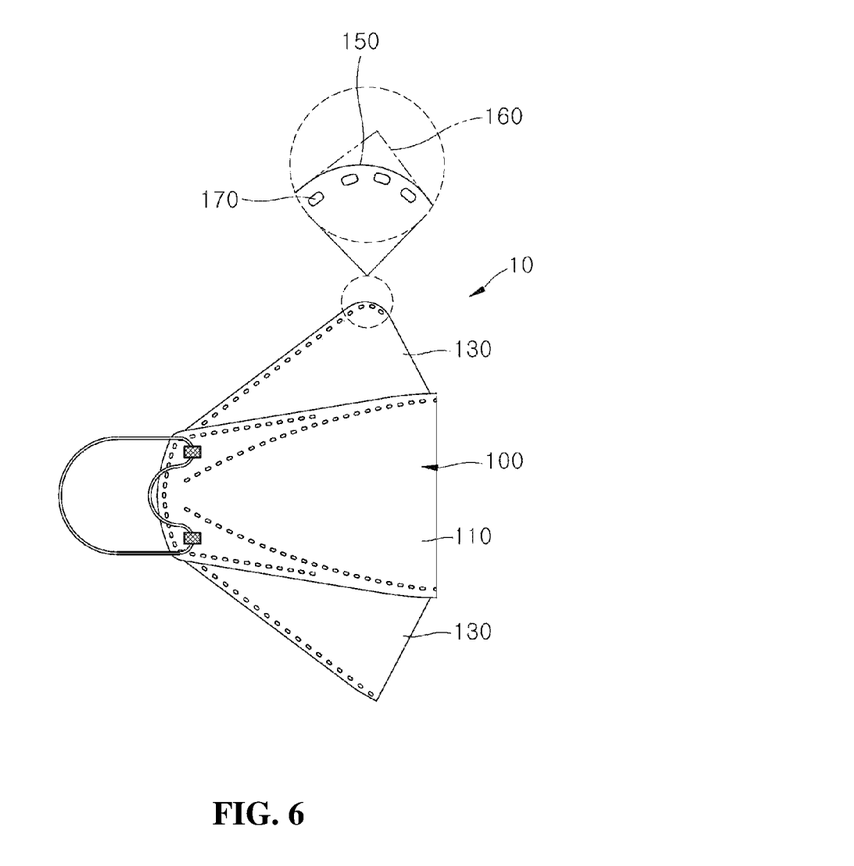
FIG. 6 illustrates a state in which a dust mask is folded in a longitudinal direction according to an example embodiment.
Figure 7:
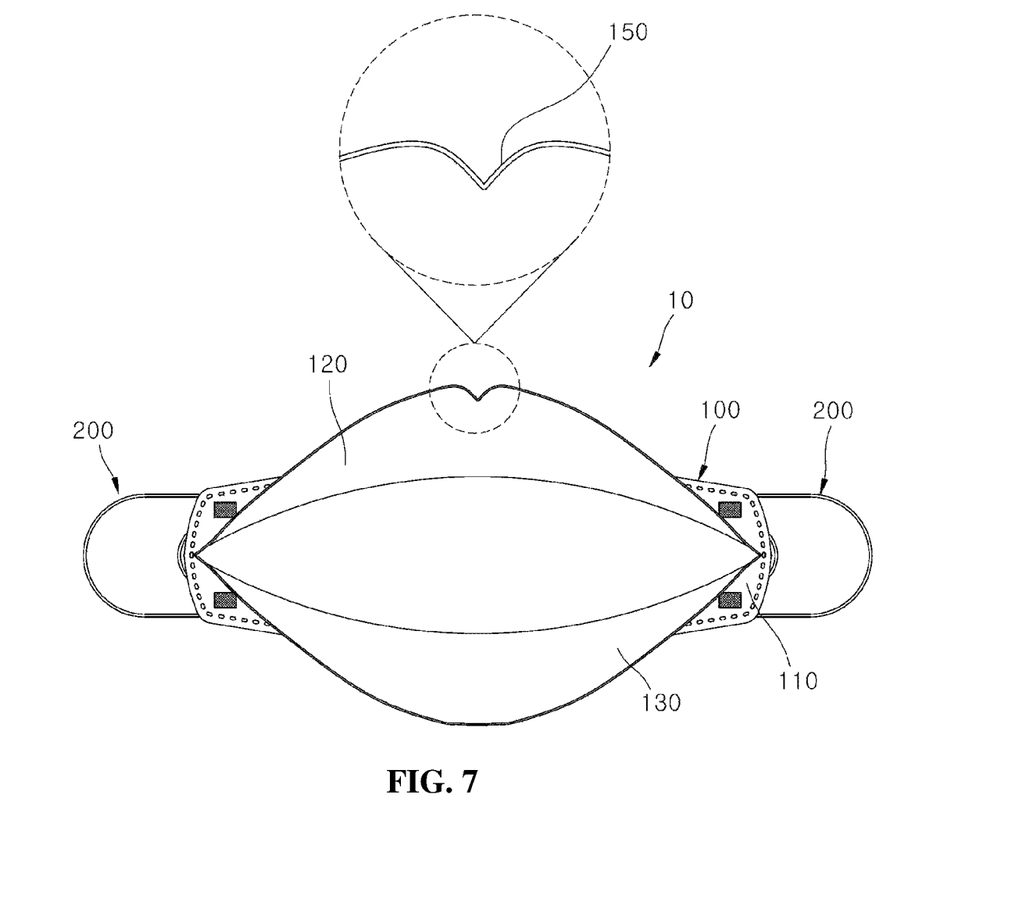
FIG. 7 illustrates a state in which an upper filter paper of the dust mask of FIG. 6 is unfolded.

FIG. 6 illustrates a state in which a dust mask is folded in a longitudinal direction according to an example embodiment, and FIG. 7 illustrates a state in which an upper filter paper of the dust mask of FIG. 6 is unfolded. Also, FIG. 8 illustrates another example of a close contact portion of FIG. 7, and FIG. 9 illustrates a wearing state of a dust mask according to an example embodiment.

Referring to FIGS. 6 and 7, a close contact portion 150 may be formed in the dust mask 10 of the present example embodiment. For example, the close contact portion 150 may be formed by cutting out a dotted portion 160 in a state in which an upper filter paper 120 is folded in half in a longitudinal direction and then forming a close contact suture 170 through ultrasonic waves. Referring also to FIGS. 6 and 7, a lower filter paper 130 is shown.

Here, when the dotted portion 160 is cut in a round shape, the close contact portion 150 in a rounded concave shape may be formed in an upper portion of the upper filter paper 120 as illustrated in FIG. 7.

Figure 8:
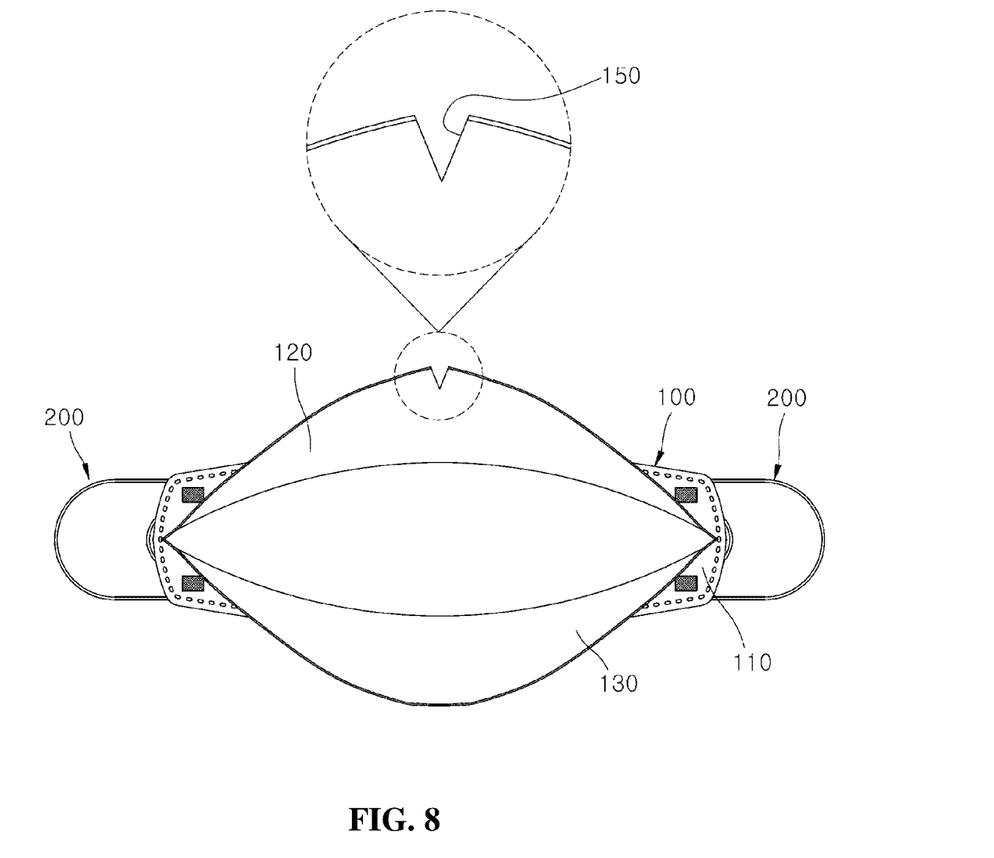
FIG. 8 illustrates another example of a close contact portion of FIG. 7.
Figure 9:
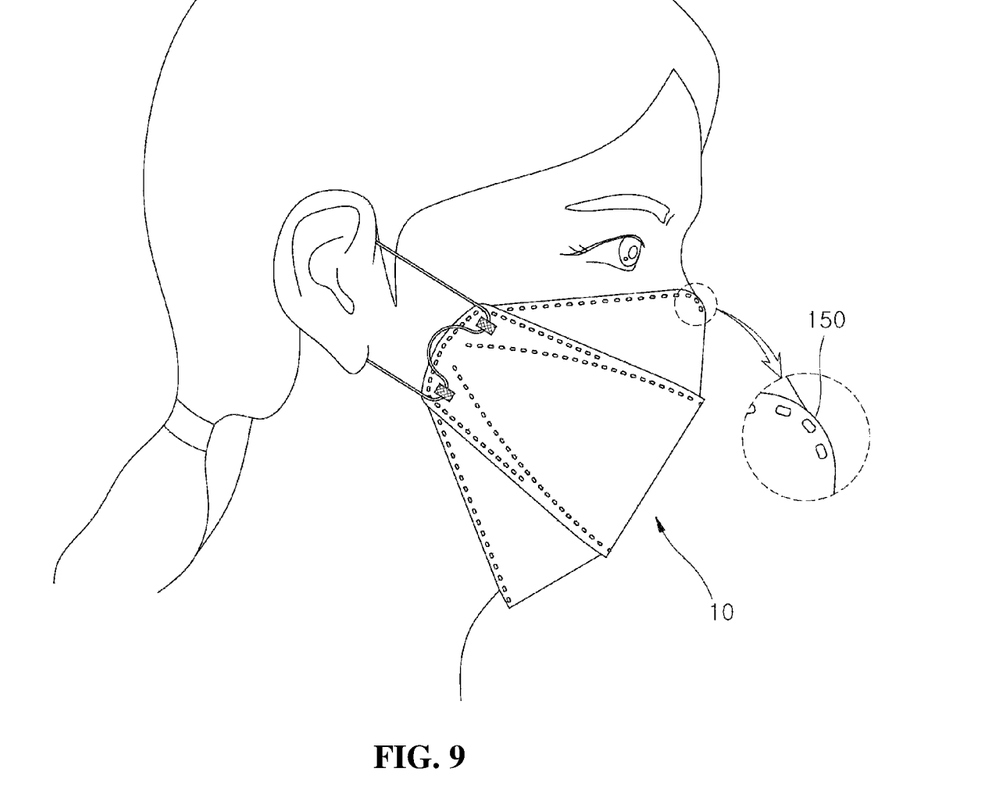
FIG. 9 illustrates a wearing state of a dust mask according to an example embodiment.

As another example, referring to FIG. 8, the close contact portion 150 may be formed by cutting a center of the upper filter paper 120 in a horizontal direction.

The close contact portion 150 may contribute to making the dust mask 10 be in close contact with the face. That is, referring to FIG. 9, when a user wears the dust mask 10 on the face, the dust mask 10 may adhere well to, that is, be in close contact with the face along the protruding contour of a nose while the close contact portion 150 is positioned on the bridge of the nose.

As a result, since a use of a tight-fitting wire used in the conventional dust mask may be fundamentally excluded, it is possible to save manufacturing cost of the dust mask 10 and to fundamentally block emission of toxic substances in a process of incinerating the tight-fitting wire.

[Operation, Effect of Dust Mask]

Figure 10:
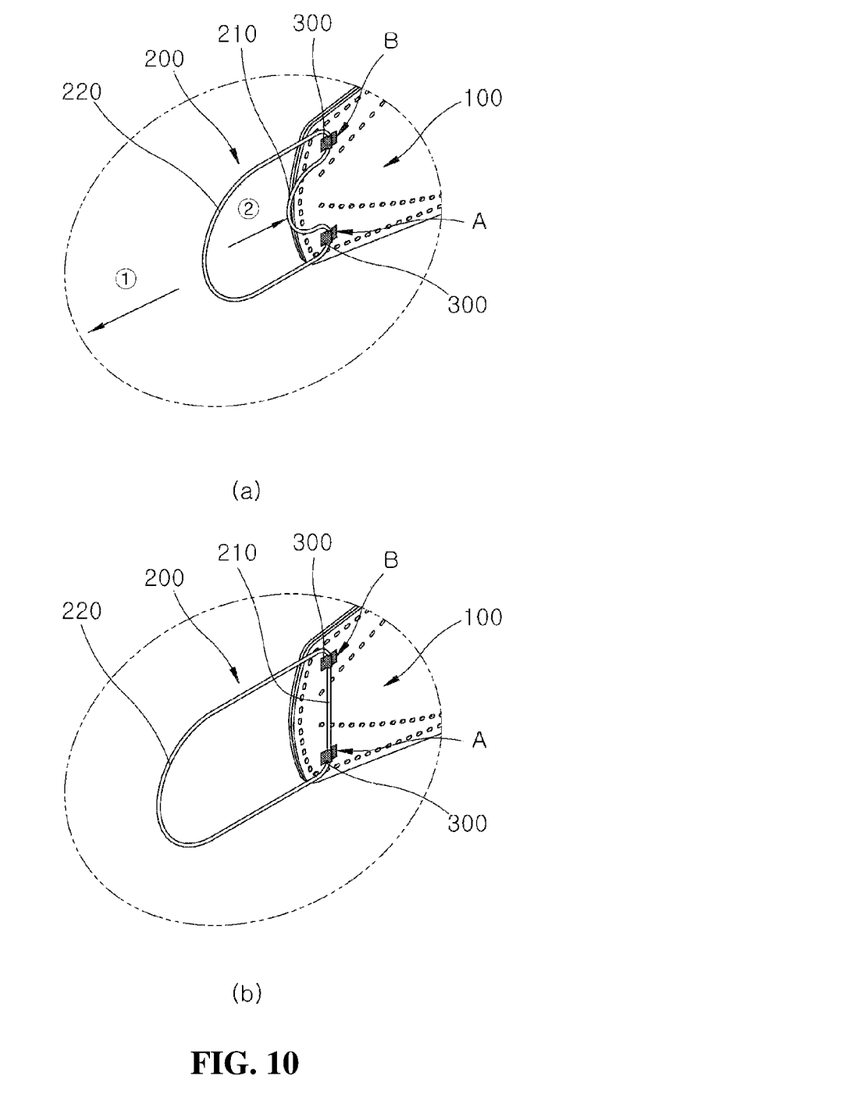
FIGS. 10(a) and 10(b) illustrate a state of adjusting a length of an ear band of a dust mask according to an example embodiment.

FIG. 10 illustrates a state of adjusting a length of an ear band of a dust mask according to an example embodiment.

Hereinafter, an operation and an effect of a dust mask according to the present example embodiment will be described with reference to FIGS. 3 to 10.

Figure 1:
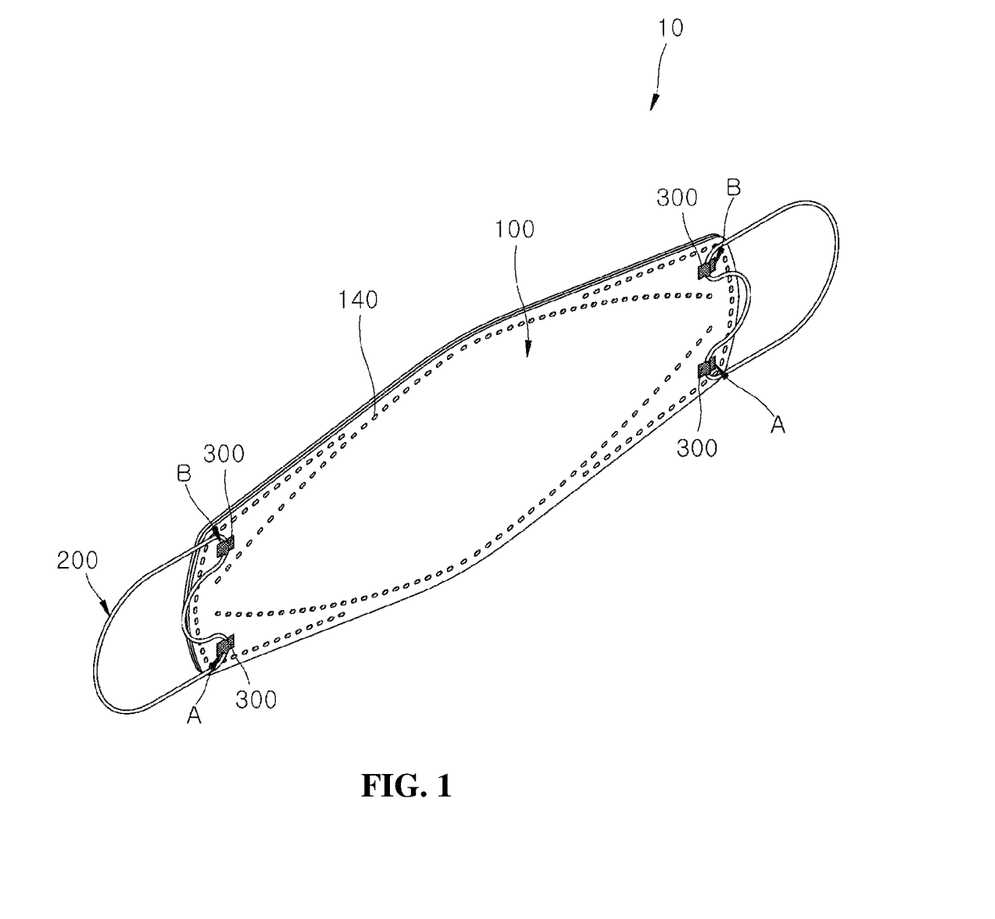
FIG. 1 is a front perspective view illustrating a dust mask according to an example embodiment.
Figure 2:
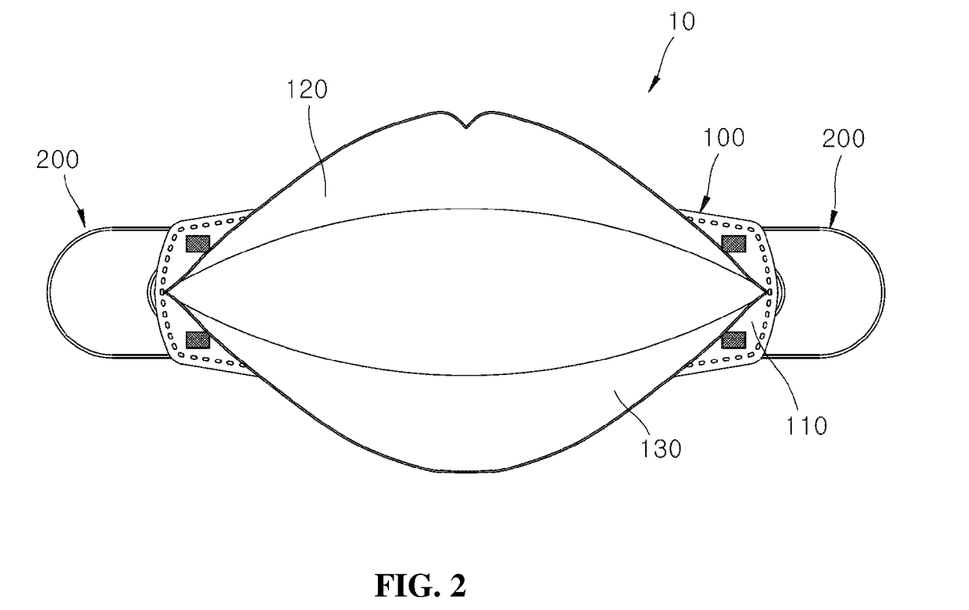
FIG. 2 is a rear perspective view illustrating a state in which the dust mask of FIG. 1 is unfolded.
Figure 3:
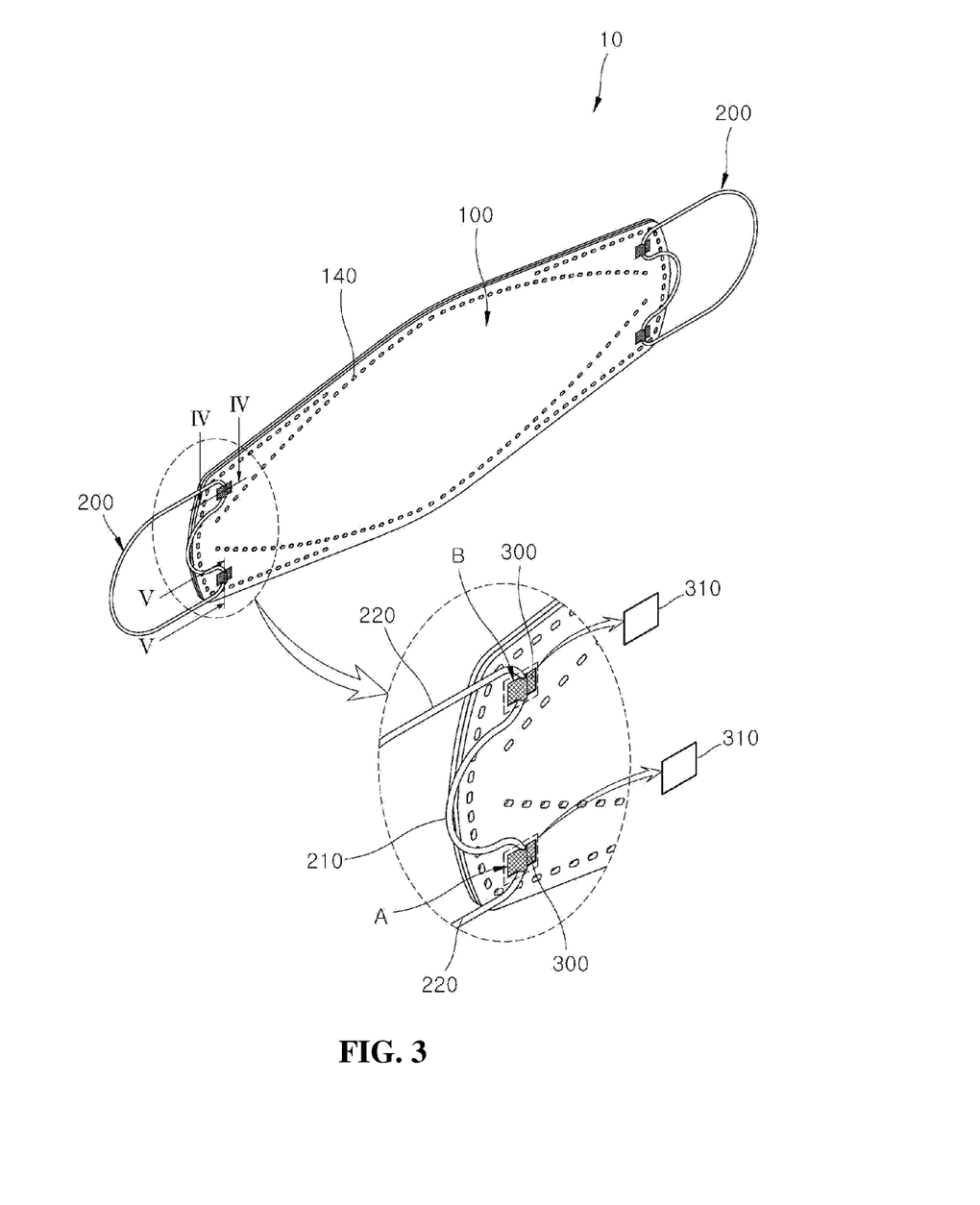
FIG. 3 is an enlarged view illustrating a partial area of the dust mask of FIG. 1.

Referring to FIG. 3, the ear band 200 may slidably couple to the sliding coupler 300 and accordingly, the ear band 200 may be installed on the mask body 100 such that the length of the outer section 220 may be readily adjusted.

For example, referring to (a) of FIG. 10, when the outer section 220 of the ear band 200 is pulled in a direction of an arrow ①, an inner section 210 of the ear band 200 moves in a direction of an arrow ②.

As a result, referring to (b) of FIG. 10, according to a decrease in a length of the inner section 210 of the ear band 200, a length of the outer section 220 of the ear band 200 may increase.

An increase in the length of the outer section 220 of the ear band 200 expresses an increase in a length of a section that may be hung on an ear of a wearer in the ear band 200.

That is, the wearer may readily adjust the length of the outer section 220 that is a section hung on the ear in the ear band 200, if necessary. Therefore, the wearer may easily and conveniently select a feeling of close contact with a mask suitable for a preference of the wearer.

Also, the length of the ear band 200 may be adjusted only when a predetermined level of force is applied and otherwise, a position of the ear band 200 may be maintained in a fastened state.

That is, the dust mask 10 of the present example embodiment may allow the wearer to easily and conveniently select a feeling of close contact with a mask suitable for a preference of the wearer and to stably maintain a state in close contact with a face of the wearer by adjusting a state of the ear band 200.

Figure 4:
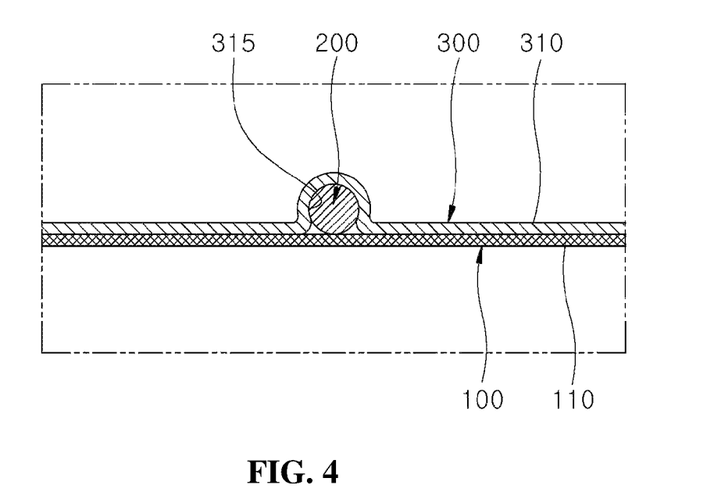
FIG. 4 is a cross-sectional view cut along a line "IV-IV" of FIG. 3.
Figure 5:
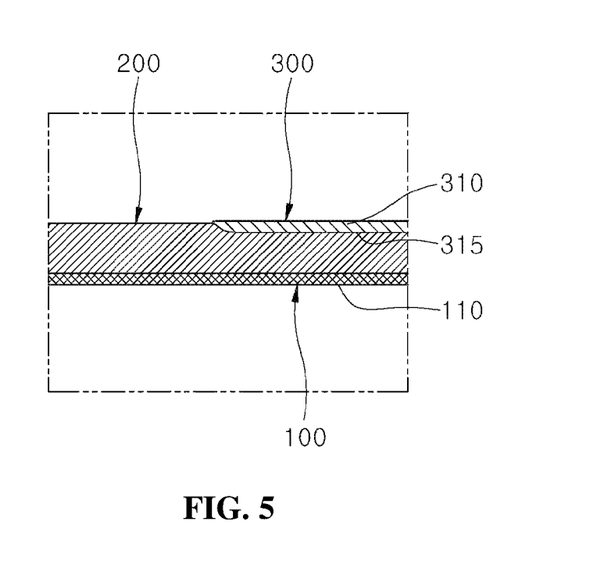
FIG. 5 is a cross-sectional view cut along a line "V-V" of FIG. 3.

Also, referring to FIGS. 3 to 5, installation of the ear band 200 in the aforementioned form may be performed through a simple process of ultrasonic-fusing the first coupling member 310 to the mask body 100 in a state in which the ear band 200 is pulled.

That is, the dust mask 10 of the present example embodiment may be easily manufactured with low manufacturing cost while allowing a feeling of close contact to be easily and conveniently adjusted and such a close contact state to be stably maintained.

Also, according to the present example embodiment, there is provided a structure in which, in a portion in which coupling between the mask body 100 and the ear band 200 is performed, the first coupling member 310 formed of a material with a a greater strength than that of the mask body 100 is added to the sliding coupler 300 and a rib structure in a grid pattern is formed in the corresponding portion.

Through this, when wearing the dust mask 10, a coupling portion between the mask body 100 and the ear band 200 may be stably supported to not be damaged due to bending or deformation.

Also, in the dust mask 10 of the present example embodiment, since the ear band 200 is installed using an ultrasonic fusion method instead of using a chemical adhesive, it is possible to effectively decrease skin irritation caused by the dust mask 10.

Another Example Embodiment of Dust Mask

Figure 11:
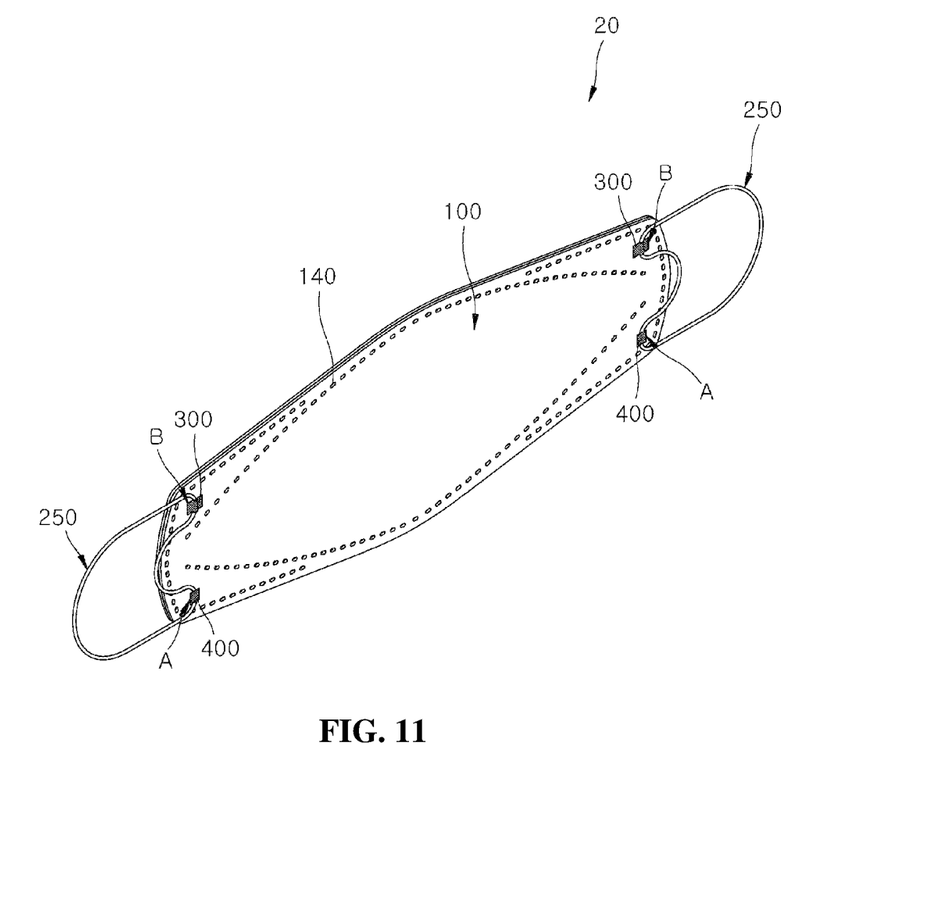
FIG. 11 is a perspective view illustrating a dust mask according to another example embodiment.
Figure 12:
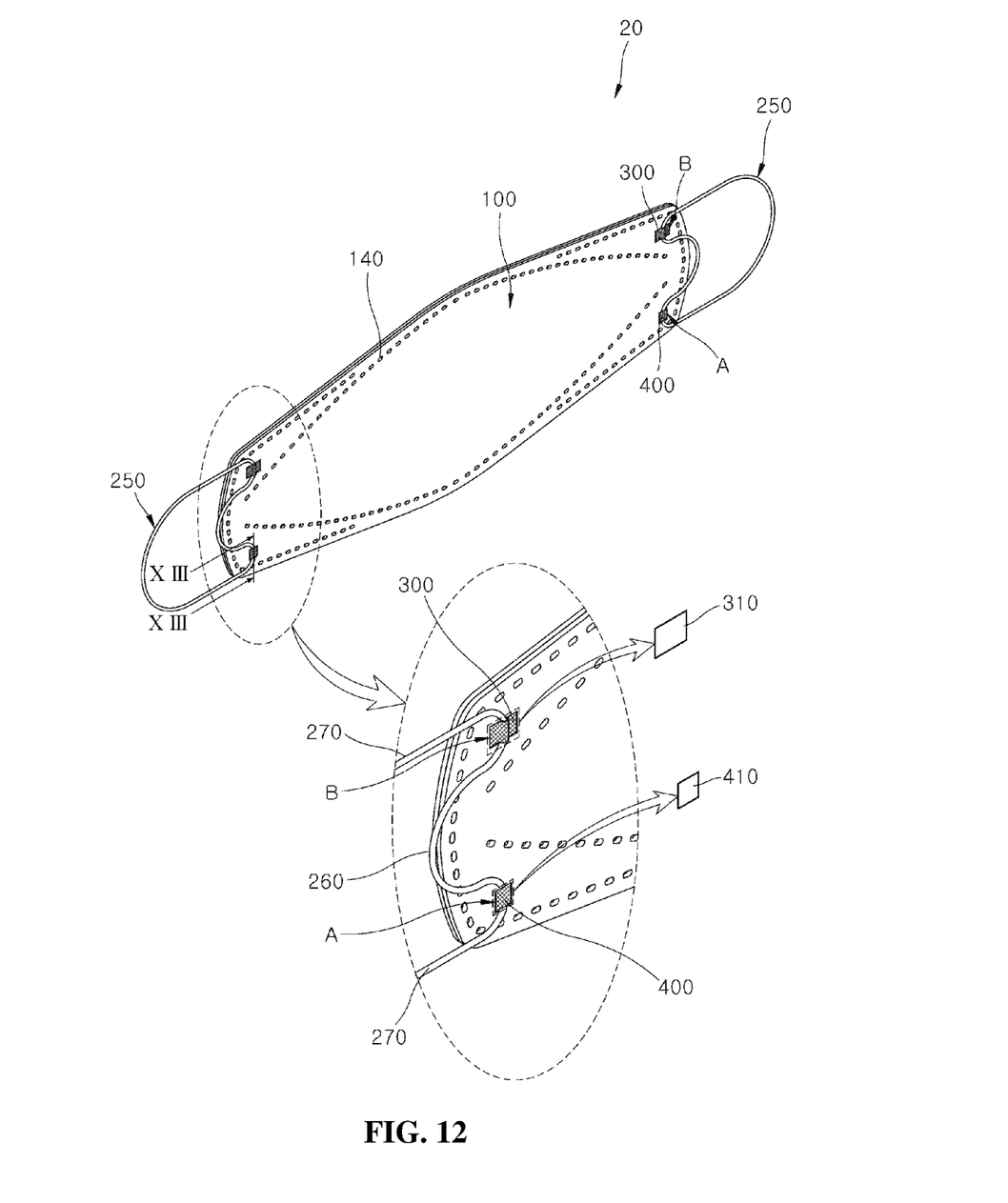
FIG. 12 is an enlarged view illustrating an enlarged partial area of the dust mask of FIG. 11.
Figure 13:
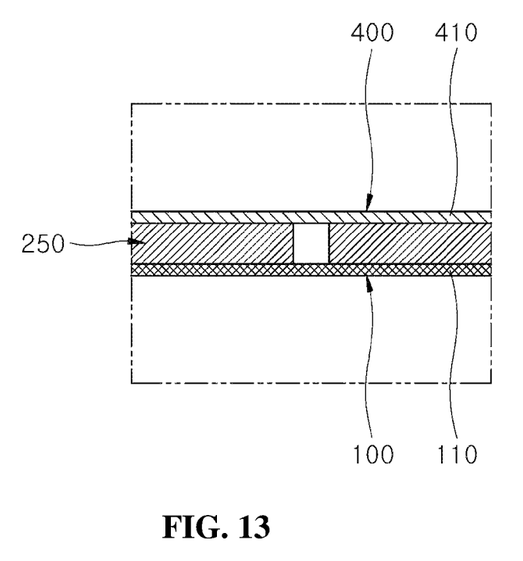
FIG. 13 is a cross-sectional view cut along a line "XIII-XIII" of FIG. 12.

FIG. 11 is a perspective view illustrating a dust mask according to another example embodiment, FIG. 12 is an enlarged view illustrating an enlarged partial area of the dust mask of FIG. 11, and FIG. 13 is a cross-sectional view cut along a line "XIII-XIII" of FIG. 12.

Referring to FIGS. 11 to 13, a dust mask 20 according to another example embodiment may further include a fastening coupler 400. The fastening coupler 400 may be provided to fasten a portion of an ear band 250 to the mask body 100.

One of the first coupler A and the second coupler B may include the sliding coupler 300 and the other one of the first coupler A and the second coupler B may include the fastening coupler 400.

The present example embodiment relates to an example in which the first coupler A is configured by including the fastening coupler 400 and the second coupler B is configured by including the sliding coupler 300.

Meanwhile, the ear band 250 may be formed in a form of a string with a predetermined length. That is, unlike a previous example embodiment in which an ear band is formed in a ring shape, the ear band 250 of the present example embodiment is provided in a form of a string of which both ends in a longitudinal direction are not connected.

In the fastening coupler 400, the ear band 250 may be fastened in such a manner that both ends of the ear band 250 in the longitudinal direction are fastened on the mask body 100. That is, dissimilar to the previous example embodiment in which coupling between an ear band and the mask body 100 is performed in a state in which both ends of the ear band in the longitudinal direction are coupled to each other and the ear band is formed in a ring shape, the present example embodiment may perform coupling between the ear band 250 and the mask body 100 in a state in which both ends of the ear band 250 in the longitudinal direction are separate.

According to this, the ear band 250 may be fastened to the mask body 100 through a single fastening coupler 400 in a state in which one end of the ear band 250 and the other end of the ear band 250 in the longitudinal direction are provided to be adjacent to each other.

The fastening coupler 400 may be configured by including a second coupling member 410. The second coupling member 410 may cover one end and the other end of the ear band 250 in the longitudinal direction and may couple to the ear band 250 and the mask body 100. The fastening coupler 400 may be formed in such a manner that the second coupling member 410 is ultrasonic-fused to the ear band 250 and the mask body 100. The second coupling member 410 may be formed of a material identical or similar to that of a first coupling member.

According to the present example embodiment, the ear band 250 may slidably couple to the mask body 100 through the sliding coupler 300, and fixedly couple to the mask body 100 through the fastening coupler 400. An inner section 260 of the ear band 250 may be provided between the sliding coupler 300 and the fastening coupler 400, and an outer section 270 may be provided outside a space between sliding coupler 300 and the fastening coupler 400.

A length adjustment of the outer section 270 of the ear band 250 may be performed through the sliding coupler 300, and fastening of the ear band 250 may be performed through the fastening coupler 400.

That is, by considering an aspect that the length of the ear band 250 is sufficiently adjustable even when each ear band 250 is connected to only a single sliding coupler 300, the sliding coupler 300 is formed only in the first coupler A and not the sliding coupler 300 but the fastening coupler 400 for fastening the ear band 250 is formed in the second coupler B.

When both ends of the ear band 250 in the longitudinal direction are coupled through the fastening coupler 400, a coupling surface may increase compared to a case in which both ends of the ear band 250 in longitudinal direction are coupled to each other and accordingly, a coupling strength of the ear band 250 may be further improved.

Since the ear band 200 is installed using an ultrasonic fusion method instead of using a chemical adhesive, it is possible to effectively decrease skin irritation caused by the dust mask 20.

Although the present invention is described with reference to the accompanying drawings, it is provided as an example only and it will be apparent to those of ordinary skill in the art that various modifications and equivalents may be made therefrom. Therefore, the true technical scope of the present invention should be defined by the following claims.

| | | |
|---|---|---|
| 10, 20: dust mask | 100: mask body | 110: central filter paper |
| 120: upper filter paper | 130: lower filter paper | |
| 140: close contact portion | 150: dotted portion | |
| 160: close contact suture | 200, 250: ear band | |
| 210, 260: inner section | 220, 270: outer section | |
| 300: sliding coupler | 310: first coupling member | |
| 315: movement passage | 400: fastening coupler | |
| 410: second coupling member | A: first coupler | B: second coupler |

What is claimed is:

1. A dust mask comprising:

a mask body having at least one filter paper;

an ear band connected to the mask body; and an ear band coupler connected to the ear band, the ear band coupler being configured to connect the ear band to the mask body, wherein the ear band coupler includes a first coupler and a second coupler that are disposed to be spaced apart by a predetermined interval in a vertical direction of the mask body, wherein the ear band is connected to the first coupler and the second coupler, respectively, and thereby coupled to the mask body, wherein the ear band is configured have a first section disposed between the first coupler and the second coupler and a second section excluding the first section, wherein the first section and the second section are interconnected in a manner that the second section is configured to decrease in length according to an increase in a length of the first section and the second section is configured to increase in length according to a decrease in the length of the first section, wherein one of the first coupler or the second coupler includes a sliding coupler configured to connect to the ear band in a manner that the ear band is slidable relative to the mask body through the sliding coupler, wherein the sliding coupler includes a first coupling member configured to cover the ear band, the first coupling member being configured to couple to the mask body in a manner that the ear band is disposed between the mask body and the first coupling member, wherein the first coupling member is coupled to the mask body on a first side of the first coupling member adjacent to the ear band and a second side of the first coupling member adjacent to the ear band, wherein a movement passage that is configured to be slidably inserted with the ear band is defined between the first side and the second side adjacent to the ear band, wherein the ear band has an elastic material capable of increasing a length of the ear band according to a decrease in a thickness of the ear band from a default state, wherein the movement passage has a narrower width than a thickness of the ear band in the default state, wherein a grid pattern is defined on the first side and the second side of the first coupling member, wherein the mask body has polypropylene material and the first coupling member has polyethylene material.

2. The dust mask of claim 1, wherein the first coupling member is coupled to the mask body in a manner that the movement passage has a width less than a thickness of the ear band that is in the default state.

3. The dust mask of claim 1, wherein the first coupling member is fused to the mask body.

4. The dust mask of claim 1, wherein the first coupling member has a material with a greater strength than that of the mask body.

5. The dust mask of claim 1, wherein the other of the first coupler or the second coupler is a fastening coupler, and wherein the fastening coupler is configured to fasten a portion of the ear band to the mask body.

* * * * *